Aug. 28, 1923.
C. C. HERMANCE ET AL
1,466,585
SEED COVERING ATTACHMENT FOR LISTERS
Filed June 30, 1921
Fig. 1.
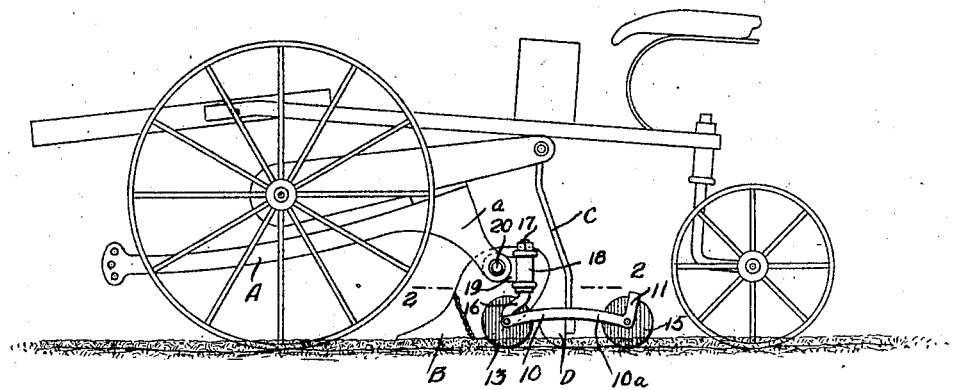
Fig. 2.
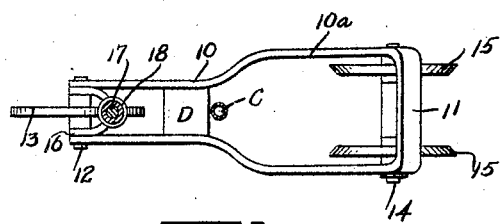
Fig. 3.
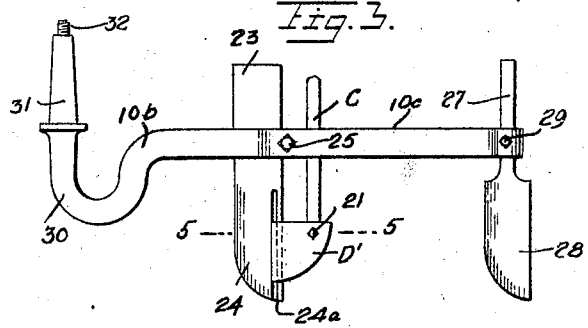
Fig. 5.
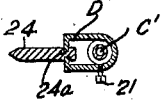
Fig. 4.
WITNESSES
INVENTORS
C.C. HERMANCE
MAX REIN
BY
ATTORNEYS Patented Aug. 28, 1923.

1,466,585

UNITED STATES PATENT OFFICE.

CHARLES C. HERMANCE AND MAX REIN, OF MUTUAL, OKLAHOMA.

SEED-COVERING ATTACHMENT FOR LISTERS.

Application filed June 30, 1921. Serial No. 481,717.

*To all whom it may concern:*

Be it known that we, CHARLES C. HERMANCE and MAX REIN, citizens of the United States, and residents of Mutual, in the county of Dewey and State of Oklahoma, have invented a new and Improved Seed-Covering Attachment for Listers, of which the following is a description.

Our invention relates to an attachment to be applied to listers for insuring the covering of the seed in the lister furrow.

The general object of our invention is to provide an attachment adapted to be secured in position to run in the rear of the mold board and provided with means to form a center line seed trench in the lister furrow, and trailing covering means so constructed and arranged as to close the center seed trench by soil pressure instead of covering the seed largely by throwing the dirt over the seed, whereby the seed contact is uniform regardless of the speed of travel of the lister. With shovel or concave disk covers as now generally in use, the soil is thrown variably according to the speed of travel of the lister. The thrown soil is more or less cloddy and direct contact between the seed and the soil is not insured. Moreover, the throwing of the soil throws also weed seed onto the planted seed.

The nature of our invention and its advantages and distinctive features will more clearly appear as the description proceeds.

Reference is to be had to the accompanying drawings forming a part of this specification, it being understood that the drawings are merely illustrative of examples of the invention.

Figure 1 is a side elevation of a lister equipped with our attachment;

Figure 2 is a sectional plan view on the line 2—2 Figure 1;

Figure 3 is a side elevation of a modified form of the attachment;

Figure 4 is a plan view of the attachment shown in Figure 3; and

Figure 5 is a horizontal section on the line 5—5 of Figure 3.

The lister may be of any approved construction having a plow beam A and a plowshare B. In the form shown in Figures 1 and 2 our attachment comprises a frame 10 having side bars, spread an increased distance at their rear portions 10ª, there being suitable connections between the sides as by an arched rear cross bar 11. Supported in the frame 10 at the front end is an axle 12 mounting a single disk 13 at the medial line of the frame and mounting at the rear end an axle 14 on which is a pair of disks 15, the disks being disposed in planes at opposite sides of the line of travel of the front disk 13. The rear disks are flat and they are bevelled at the peripheries to present a peripheral cutting edge. Means are provided to secure the attachment at the front end thereof in position by a vertical pivot. In the illustrated example a U-shaped element 16 is mounted on the front axle 12 and terminates at its upper end in a spindle 17 turning in a vertical bearing 18 and a bracket 19 secured to the standard a of the plow beam A by a transverse pivot 20.

With the described arrangement the front wheel 13 will travel in the lister furrow made by the plowshare B and will press down a seed trench at the medial line of the furrow. The side bars of the frame 10 lie at opposite sides of the seed tube C having a seed guide D of known construction. Thus, the seed is dropped in the trench formed by the disk 13. The rear disks 15 with their cutting edges will cut into the soil and with their bevel at the cutting edges will close the seed trench over the seed by soil pressure by reason of the flat form of the rear disks 15 and their parallel arrangement at opposite sides of the trench forming disk 13.

In the form shown in Figures 3 and 4, the frame 10ᵇ, is forked at its rear end and at the forwardly convergent end of the forked members, the seed tube C' is accommodated, to which tube shoe D' is held by a set screw 21 or the like. In front of the seed tube is a vertical slot 22 for the shank 23 of a blade 24 functioning similarly to the disk 13, said shank being clamped by a bolt 25 passing through the fork 10ᶜ adjacent to slot 22. The blade 24 has a vertical slot 24ª receiving the front of the shoe D', to permit vertical adjustment of the shoe and blade. The arms of the fork 10ᶜ are formed at their rear ends with vertical holes 26 to receive the shanks 27 of covering blades 28 of wedge shape in horizontal section, the said shanks 27 being held by set screws 29. The frame 10ᵇ is shown as having an upturned front end 30 formed with a spindle 31 adapted to be received in a bearing 18 or equivalent bearing to permit lateral turning movement of the frame.

In both forms of the invention the trench is closed by the displacement of the soil laterally by direct pressure thereon of the covering elements, whether the covering elements be disks or blades, so that the trench is closed by crowding of the soil as distinguished from throwing the soil over the seed.

A result of the action of the attachment is that the seed in the center trench is prevented from being washed away on slopes during heavy rains. In practice, the outer trenches are left open to carry away surplus water. A result also is that the seed is planted from one to two and one-half inches deep in the center of the lister furrow bottom. Every individual seed goes to the bottom of the trench. All the germinating force is exerted upward. A further result is that moisture for germination is held longer. Enough soil rolls back from the mould boards for forming a mulch in the furrow.

We would state in conclusion that while the illustrated examples constitute practical embodiments of our invention, we do not limit ourselves strictly to the exact details herein illustrated, since manifestly the same can be considerably varied without departure from the spirit of the invention as defined in the appended claims.

Having thus described our invention, we claim:

1. A lister attachment adapted to be attached to the plow beam of a lister plow at the rear of the lister, said attachment comprising a frame mounted to swing horizontally, an element on said frame at its forward end adapted to travel in a furrow opened by the lister plow, and a pair of covering elements at the rear of said frame for crowding the soil on the sides of the furrow laterally inward over the path traveled by the first-mentioned element.

2. An attachment for lister plows comprising a vertical bearing attached to swing vertically secured to the plow beam of the lister plow at the rear of the lister, a stub shaft comprising a bifurcated end portion rotatably carried in said vertical bearing, a substantially U-shaped frame disposed horizontally pivoted to the lower portion of said bifurcated end, an element at the forward end of said U-shaped frame adapted to travel in the furrow opened by the lister plow and a pair of covering elements at the rear end of said U-shaped frame for crowding the soil at the sides of the furrow laterally inward and over the path travelled by the first-mentioned element.

3. An attachment for lister plows adapted for connection to the plow beam of the lister plow and comprising a frame swingable both vertically and horizontally and carrying at the forward end an element travelling in the furrow opened by the lister plow and at the rear end a pair of crowding elements adapted to crowd the soil at the sides of the furrow laterally inward over the path travelled by the first-mentioned element.

4. As a new article of manufacture, an attachment for lister plows adapted for connection to the plow beam of the lister plow and comprising a frame pivoted to swing both vertically and horizontally and carrying at its forward end an element adapted to travel in the furrow opened by the lister plow and a pair of covering elements at its rear and adapted to crowd laterally inward the soil at the sides of the furrow over the path travelled by the forward element.

CHARLES C. HERMANCE.
MAX REIN.